(12) United States Patent
Desnijder

(10) Patent No.: US 11,350,569 B2
(45) Date of Patent: Jun. 7, 2022

(54) FORAGE HARVESTER COMPRISING A MONITORING MECHANISM FOR SHEAR BAR AND CUTTING DRUM

(71) Applicant: CNH Industrial America LLC, New Holland, PA (US)

(72) Inventor: Dirk J. Desnijder, Wondelgem (BE)

(73) Assignee: CNH Industrial America LLC, New Holland, PA (US)

( * ) Notice: Subject to any disclaimer, the term of this patent is extended or adjusted under 35 U.S.C. 154(b) by 396 days.

(21) Appl. No.: 16/475,973

(22) PCT Filed: Jan. 5, 2018

(86) PCT No.: PCT/EP2018/050255
§ 371 (c)(1),
(2) Date: Jul. 3, 2019

(87) PCT Pub. No.: WO2018/127556
PCT Pub. Date: Jul. 12, 2018

(65) Prior Publication Data
US 2021/0127578 A1    May 6, 2021

(30) Foreign Application Priority Data
Jan. 6, 2017 (BE) .................... 2017/5004

(51) Int. Cl.
*A01D 43/08* (2006.01)
*A01D 34/00* (2006.01)
(Continued)

(52) U.S. Cl.
CPC ......... *A01D 43/085* (2013.01); *A01D 34/008* (2013.01); *A01D 34/43* (2013.01); *A01D 34/60* (2013.01)

(58) Field of Classification Search
CPC .... A01D 43/085; A01D 34/008; A01D 34/43; A01D 34/60
See application file for complete search history.

(56) References Cited

U.S. PATENT DOCUMENTS

2004/0168528 A1    9/2004  Heinrich et al.
2005/0072135 A1    4/2005  Kormann
(Continued)

FOREIGN PATENT DOCUMENTS

DE         19903153 C1      3/2000
DE     102009029675 A1      5/2010
(Continued)

OTHER PUBLICATIONS

PCT International Search Report for PCT application PCT/EP2018/050255, dated Apr. 16, 2018 (10 pages).
(Continued)

*Primary Examiner* — Abigail A Risic
(74) *Attorney, Agent, or Firm* — Peter Zacharias; Patrick Sheldrake

(57) ABSTRACT

A forage harvester including a frame, a cutting arrangement and a plurality of displacement mechanisms. The cutting arrangement includes a cutting drum that is rotatable about a rotation axis with respect to the frame, and a shear bar holder configured to receive a shear bar attached thereto. Each of the displacement mechanisms including an actuator for displacing the shear bar with respect to the cutting drum and the frame. The displacement mechanisms include a sensor arrangement to measure one or more values representative of a force exerted on the shear bar and the shear bar holder when the cutting drum is rotating and cutting crops supplied to an area between the cutting drum and the shear bar.

12 Claims, 4 Drawing Sheets

(51) Int. Cl.
*A01D 34/43* (2006.01)
*A01D 34/60* (2006.01)

(56) References Cited

U.S. PATENT DOCUMENTS

| | | | |
|---|---|---|---|
| 2005/0076631 A1* | 4/2005 | Wolf | A01F 29/22 56/500 |
| 2005/0124263 A1 | 6/2005 | Clauss | |
| 2007/0233416 A1* | 10/2007 | Jeppe | A01F 29/095 702/127 |
| 2007/0266687 A1* | 11/2007 | Diekhans | A01D 43/085 56/14.1 |
| 2010/0126258 A1* | 5/2010 | Beck | A01F 29/22 73/104 |
| 2012/0293157 A1 | 11/2012 | Loebe et al. | |
| 2013/0042591 A1* | 2/2013 | Behnke | A01F 29/22 56/10.2 A |
| 2014/0215985 A1* | 8/2014 | Pollklas | A01D 43/085 56/10.2 R |
| 2014/0347474 A1 | 11/2014 | Madsen | |

FOREIGN PATENT DOCUMENTS

| | | |
|---|---|---|
| DE | 102010021746 A1 | 11/2011 |
| EP | 1023827 A1 | 8/2000 |
| EP | 2311601 A1 | 4/2011 |
| EP | 2436258 A1 | 4/2012 |

OTHER PUBLICATIONS

Extended European Search Report for BE application BE2017/5004, dated Oct. 17, 2017 (12 pages).

* cited by examiner

A-A

FORAGE HARVESTER COMPRISING A MONITORING MECHANISM FOR SHEAR BAR AND CUTTING DRUM

FIELD OF THE INVENTION

The present invention is related to forage harvesters used in agriculture for collecting and cutting crops, and in particular to the monitoring of the condition of the cutting knives and the shear bar of the harvester.

STATE OF THE ART

Forage harvesters comprise a feeder portion at the front of the machine, which receives the crops collected by a header, e.g. a corn header or a pick-up, and feeds it towards a cutting drum. The cutting drum is provided with knives arranged along its circumference, which move past a shear bar as the drum rotates. The shear bar is arranged in close proximity to the knives so that crop is chopped when supplied to the area between the knives and the shear bar. The efficiency of the chopping action in terms of the power consumption and chop quality is determined by the clearance between the knives and the shear bar as well as by the sharpness of the knives and the shear bar. When the knives and/or the shear bar become blunt, the crops are wedged between the knives and the shear bar which causes a sharp increase in the power consumption and a deterioration of the chop quality. Modern harvesters are equipped with an adjustment mechanism for fine adjusting the shear bar clearance. Also, a mechanism for sharpening the knives is often integrated in the harvester. A correct monitoring of the chopping action is however required so that dependable indications are given to the operator about when an adjustment of the shear bar and/or a sharpening of the knives is required.

Document EP-A-1023827 shows an adjustment mechanism for the shear bar comprising a pair of pivotable adjustment arms mounted on either side of the shear bar and configured to adjust the angular position of the shear bar holder, which is basically a beam onto which the shear bar is attached. The holder is pivotable about an axis that is parallel to the rotation axis of the cutting drum. The adjustment arms are connected to adjustment spindles actuated by electric motors. Forces exerted on the shear bar are measured by strain gauges on the shear bar holder, or by position sensors or vibration sensors. The direct mounting of sensors on the shear bar holder is problematic however. The amount of dust, dirt and fluids from the crops is highest in this area, leading to an increased risk of a sensor malfunction. The output of the sensor types mentioned in the cited document is also not directly representative for the load to which the shear bar is subjected during operation of the harvester. This load may be calculated from the sensor output but the reliability of such a calculation step may not always be assured.

SUMMARY OF THE INVENTION

The invention is related to a forage harvester and to methods for monitoring the condition of the knives and the shear bar on a forage harvester as described in the appended claims. The invention is in particular related to a harvester comprising:

a frame, a cutting arrangement comprising a cutting drum that is rotatable about a rotation axis with respect to the frame, and a shear bar holder configured to receive a shear bar attached thereto, a plurality of displacement mechanisms, each displacement mechanism comprising an actuator for displacing the shear bar with respect to the cutting drum and the frame. The actuator is in particular configured to displace a point of the shear bar holder. At least two actuators (and therefore at least two displacement mechanisms) are therefore required to displace the shear bar.

According to the invention, at least one of the displacement mechanisms comprises a sensor arrangement configured to measure one or more values representative of the force exerted on the shear bar and the shear bar holder when the cutting drum is rotating and cutting crops supplied to an area between the drum and the shear bar.

The sensor or sensors which form the sensor arrangement are part of the displacement mechanisms, i.e. the sensors are not mounted on the shear bar holder or the shear bar itself. This allows a more favourable position of the sensors that is remote from the shear bar holder so that malfunctioning of the sensors is less likely. According to preferred embodiments, the sensor arrangement comprises a force transducer configured to measure the force exerted by the actuator on the frame of the harvester. The use of a force transducer is advantageous in that the output of the transducer is directly related to the force exerted on the shear bar and shear bar holder during operation of the harvester. Preferably, the actuator is mounted between a first location on the frame and a second location on the shear bar holder or on a structure that is rigidly attached to or uniform with the shear bar holder and the force transducer is mounted in the first location, between the actuator and the frame. This location of the force transducer is remote from the shear bar, hence advantageous in terms of avoiding contamination of the transducer.

According to other embodiments, the sensor arrangement comprises a pressure sensor for measuring the pressure in a compartment of a hydraulic actuator used in the displacement mechanisms. The embodiments wherein only a pressure sensor is used and not a force transducer can be realized according to the various embodiments described in this specification and in the claims, which employ a hydraulic actuator, and wherein the force transducer is omitted.

DETAILED DESCRIPTION OF PREFERRED EMBODIMENTS OF THE INVENTION

Preferred embodiments will now be described with reference to the drawings. The detailed description is not limiting the scope of the invention, which is defined only by the appended claims.

Figure 1:
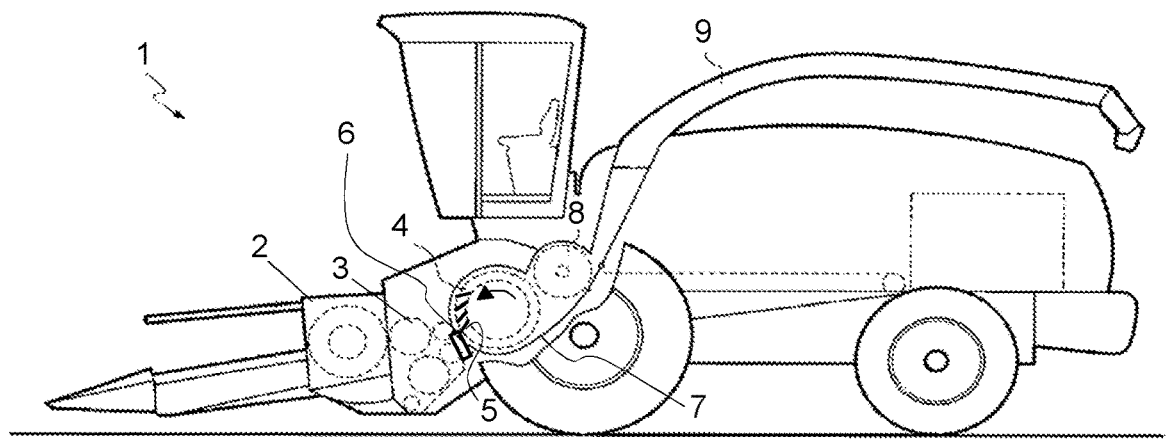
FIG. 1 shows a side view of a forage harvester, with the main components that are relevant for the invention indicated on the drawing.

FIG. 1 shows a schematic side view of a forage harvester 1 including its main components. As the harvester advances through a field, crops are gathered by a header 2 and transported to a central area of the header where the crops enter a set of feed rolls 3. The rolls guide the crops in the form of a mat with a given thickness towards the cutting drum 4, which rotates in the direction indicated by the arrow, about a rotation axis that is transversal to the direction of movement of the crops. Knives 5 are mounted on the drum (only four are shown, the knives are distributed along the full circumference of the drum), so that the knives pass by a stationary shear bar 6 as the drum rotates, thereby chopping the crops into small pieces which are further transported between the cutting drum 4 and a concave 7. The chopped material is then ejected by a blower 8 through a spout 9.

A forage harvester according to the invention comprises the above components which may be configured according to known practice. The shear bar is furthermore equipped with an adjustment mechanism which also has several characteristics in common with known systems, in particular with the system described in EP-A-1023827. The harvester of the invention is however equipped with a new arrangement for monitoring the condition of the shear bar 6 and the cutting knives 5.

Figure 2:
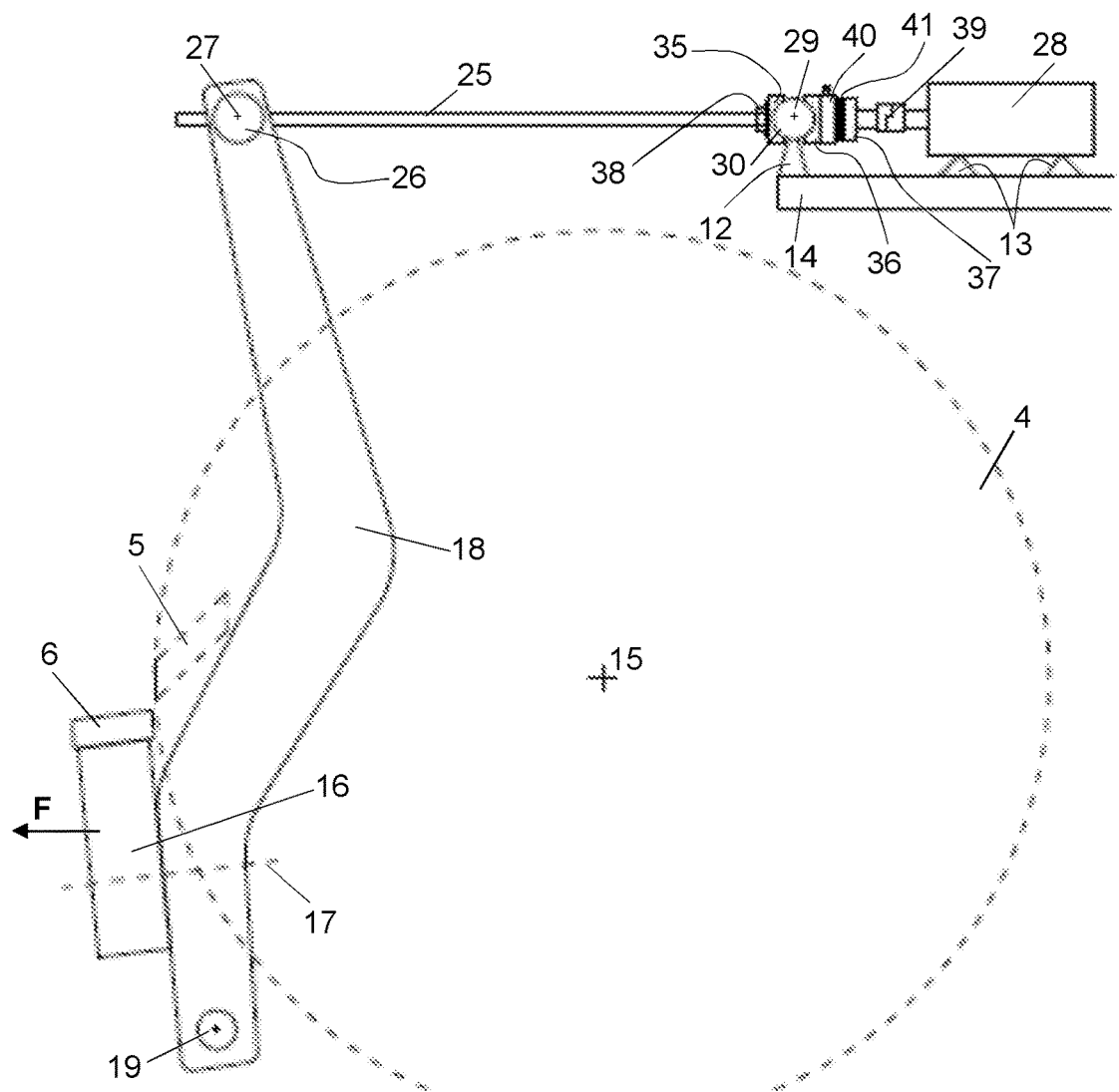
FIG. 2 is a conceptual drawing of a side view of the cutting drum and shear bar in a harvester according to one embodiment of the invention, including the mechanism for monitoring the force exerted on the shear bar.

FIG. 2 shows a schematic image of the shear bar displacement mechanism in a forage harvester according to a first embodiment of the invention. The cutting drum 4 is visible with only one knife 5 shown in order not to complicate the drawing. The drum rotates about its rotation axis 15, with respect to a fixed structure mounted on the chassis of the harvester, and hereafter referred to as the frame 14. The shear bar 6 is mounted on a shear bar holder 16, which is a beam-shaped element attached at its two ends to the lower part of a pair of adjustment arms 18, for example by bolt connections symbolized by the line 17. The arms 18 are pivotable about pivot axes 19 with respect to the frame 14, the pivot axes being essentially parallel to the rotation axis 15 of the cutting drum. Only one adjustment arm 18 is shown in the side view. The arms 18 are mounted on both sides of the shear bar holder 16. The pivotal position of each adjustment arm 18 is actuated by a threaded adjustment spindle 25 that engages with a threaded nut 26 that is pivotable about a transversal axis 27 with respect to the arm 18 and located at the upper end of the arm. The threaded spindle 25 is rotatable about its central axis, said rotation being driven by a motor 28 which is preferably an electric motor mounted on the frame 14. The motor 28 is fixed to the frame 14, as symbolized by the triangular supports 13 in FIG. 2 (in reality the motor 28 is preferably mounted in a specifically shaped bracket as shown further). The rotation of the spindle 25 actuates a forward or backward movement of the nut 26 and thereby an adjustment of the shear bar position. The spindle 25 is pivotable with respect to the frame about a transversal axis 29 to allow for the circular motion of the nut 26 about the pivot axis 19 of the adjustment arm. For this purpose, the spindle traverses a pin 30 with a cylindrical outer surface. The pin 30 is fixed to the frame 14 as symbolized by connection 12 (in reality the pin is preferably mounted between two plates). Side pieces 35/36 are clamped around the pin 30, between a disc 37 that is uniform with the spindle (preferably welded to the spindle), and a nut 38. The side pieces 35/36 have a cylindrical inner surface of the same shape as the pin 30, so that the side pieces may pivot about the pin. The motor 28 is coupled to the spindle 25 through a flexible coupling 39, capable (within limits) of actuating the spindle rotation regardless of the angular position of the spindle about pivot axis 29.

The inventive characteristic in this particular embodiment is the presence of a force transducer 40 between the disc 37 and the side piece 36 on the side of the actuator 28. A thrust bearing 41 is mounted between the force transducer 40 and the disc 37 so that the disc 37 is free to rotate relative to the transducer. The force transducer 40 is configured to measure the force exerted by the spindle 25 on the frame 14 when the shear bar 6 and shear bar holder 16 are subjected to a force symbolized by the arrow F in FIG. 2. This is the direction of the force exerted by the crops on the shear bar holder 16 as the crops pass between the rotating drum 4 and the shear bar 6. Preferably a force transducer 40 is mounted on each of the adjustments spindles 25 on either side of the shear bar 6. The output of these force transducers is therefore representative of the load to which the shear bar 6 and shear bar holder 16 are subjected during operation of the harvester, and hence of the condition of the shear bar and the knives on the cutting drum. As this condition deteriorates, the force F exerted on the shear bar 6 and shear bar holder 16 increases due to wedging of crop between the shear bar and the knives.

The read-out signal of the force transducers 40 is a dynamic signal that may be treated by known signal processing methods in order to derive at regular instances in time a value that is representative of the force F. This may for example be a time-averaged amplitude of the signal. This output value for each transducer 40, or possibly a single output calculated from the outputs of the two transducers 40, may be used as input for a monitoring method wherein the output value is compared at said regular instances to a reference value and a warning signal is given to the operator when the force exceeds (or exceeds to a predefined degree) the reference value, indicating that wear of the shear bar and/or the knives has become critical.

The position of the force transducers 40 is favourable for obtaining a stable and repeatable measurement. The transducers are far removed from the critical areas where dust and dirt are likely to cause malfunctioning. The output of the force transducer is equal to a measured force and does not require further calculation steps. The output is proportional furthermore to the force F exerted on the shear bar, and thereby directly representative of this force. A particular advantage of any embodiment involving pivotable adjustment arms 18 is the fact that the force that is measured is reduced with respect to the force F by the lever ratio of the adjustment arms 18 and possibly by friction forces in the pivot point 19 and at other areas of the adjustment arms 18. This makes it possible to use a standard transducer that is not designed for extremely high forces.

The read-out signal of the force transducers 40 and the derived output value(s) may be combined with data obtained from other sensors on the forage harvester. According to a preferred embodiment, the ratio is monitored of the output value(s) representative of the force F and the output of one or more yield sensors. A yield sensor indicates the crop yield of the harvester and is known per se and therefore not described here in detail. The ratio of the transducer output to the yield is a parameter that can be monitored with respect to a reference that is not or to a lesser degree dependent on external conditions, such as the moisture of the harvested crops.

Figure 3A:
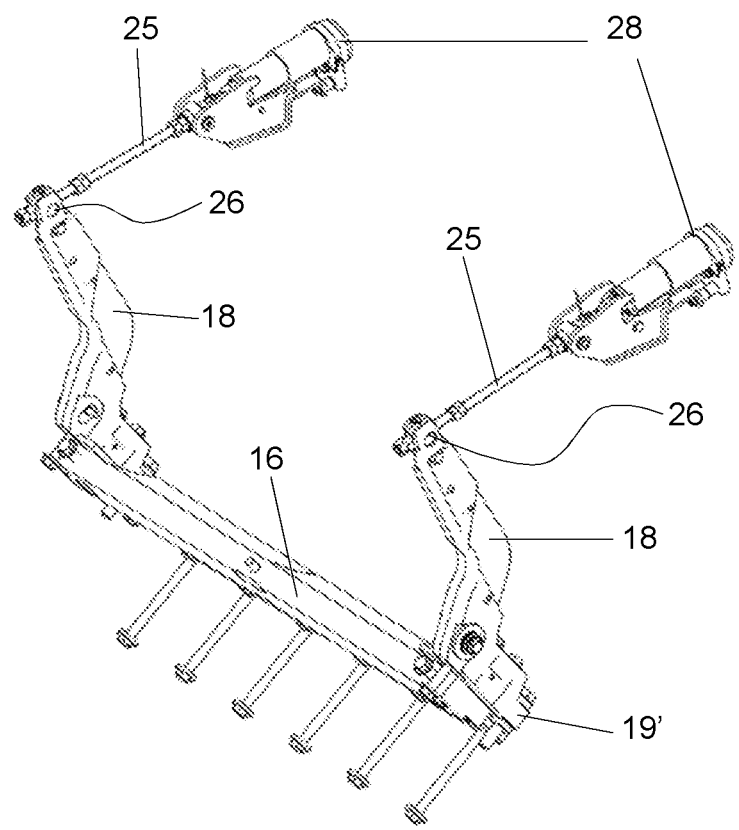
FIGS. 3a and 3b are views of the mechanism of FIG. 2, applied in an actual harvester.
Figure 3B:
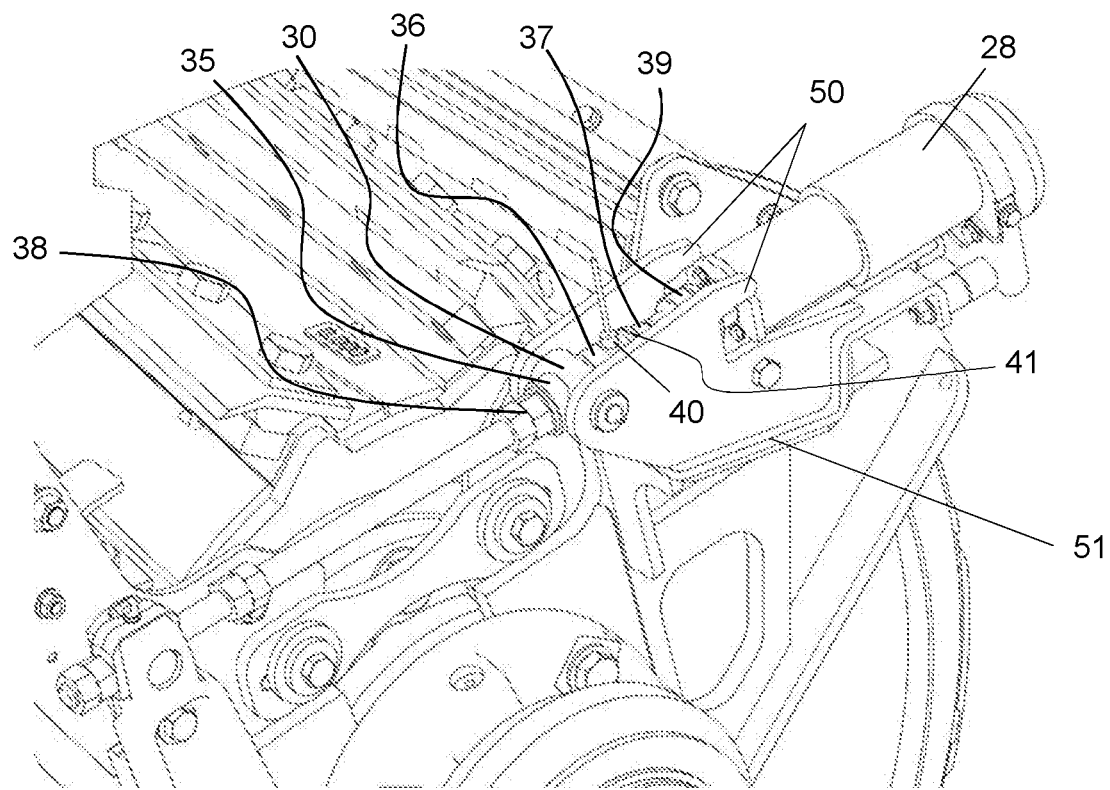

FIGS. 3a and 3b illustrate the position of the force transducer 40 in an actual harvester. The cutting drum 4 is not visible in FIG. 3a in order not to obscure the view of the adjustment mechanisms. The adjustment arms 18, the shear bar holder 16, the spindles 25, the pivotable nuts 26 and the electric motors 28 are indicated in the drawing. The arms 18 are pivotable about the frame 14 through a ball joint 19'. FIG. 3b shows the position of the force transducer 40 with respect to the hollow pin 30, the cylindrical side pieces 35/36, the disc 37, a pair of clamping nuts 38, the thrust bearing 41 and the flexible coupling 39. It is seen that the pin 30 is mounted between parallel plates 50 which are fixed to a bracket 51 onto which the motor 28 is also mounted. The bracket 51 is itself fixed to the frame of the harvester.

The transducer 40 may be a ring type piezo-electric force transducer that is commercially available and suitable for measuring the range of forces which are expected on the specific location of the force transducer. A suitable type of force transducer is the Paceline CFW IP65 sensor from HBM Test and Measurement GmbH.

Variations to the first embodiment are included in the scope of the invention For example, the pin 30 may itself be pivotable with respect to the frame 14, with the side pieces 35/36 mounted on the pin in a non-pivotable way, for example by using a pin 30 and side pieces with corresponding polygon-shaped surfaces. In another alternative, the electric motor 28 could be connected to the spindle 25 by a non-flexible coupling, while the motor itself is pivotable about the pin 30 together with the spindle 25. In this case the motor 28 is mounted on a bracket that allows this pivoting motion of the motor.

Figure 4A:
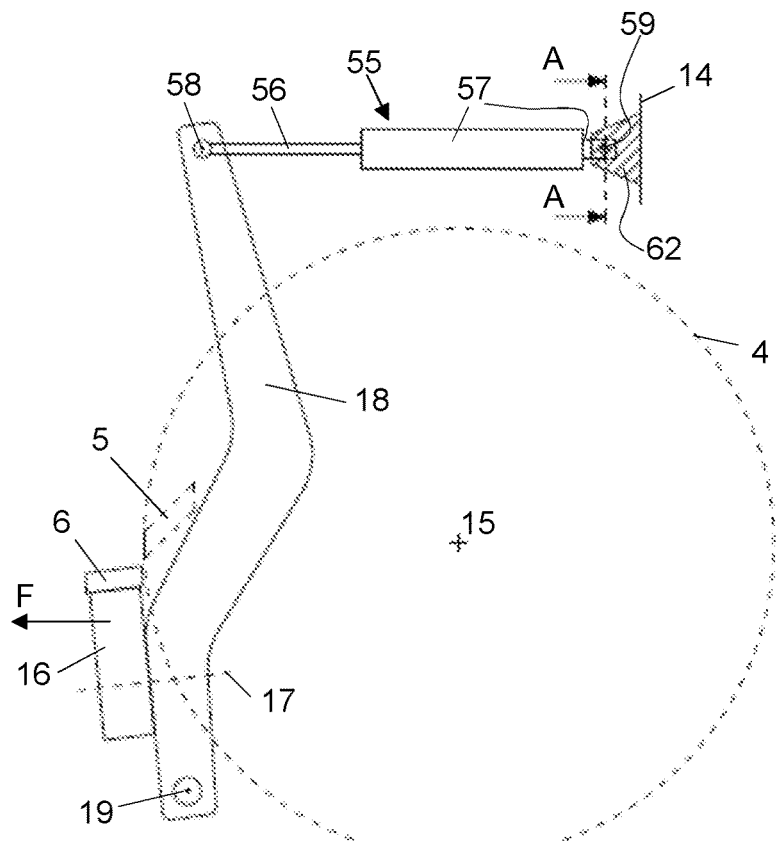
FIG. 4 illustrates an alternative embodiment, wherein a variable length actuator replaces the spindle and electric motor combination of FIGS. 2 and 3.

FIG. 4 shows another alternative, wherein the spindle is replaced by a variable length actuator 55. This may be a hydraulic or an electric actuator as known per se in the art, wherein a slidable portion 56 can be extended or retracted relative to a base portion 57. When the actuator 55 is a hydraulic actuator, the base portion 57 is a hydraulic cylinder and the slidable portion 56 is a rod coupled to a hydraulic piston, which divides the cylinder into two compartments connected to a hydraulic circuit. The slidable portion 56 of the actuator is pivotably connected to the adjustment arm 18 via a first pivot 58. The base portion 57 is pivotably connected to the frame 14 of the harvester via a second pivot 59. FIG. 4 also shows a detailed section of the second pivot 59. According to the preferred embodiment shown in the drawing, the second pivot is constructed as a ball joint 60, with a draft sensor 61 mounted transversally with respect to the joint and supported by a pair of parallel plates 62 fixed to the frame 14. A draft sensor is known per se in the art. It is a pin-shaped force transducer configured to measure the force transversal to the pin. The draft sensor is attached to the frame by a bracket 63. As in the first embodiment, the transducer 61 measures the force exerted by the actuator 55 on the frame 14. This force is related to the force F exerted on the shear bar 6 and the shear bar holder 16 in the same way as in the first embodiment. When the variable length actuator 55 is a hydraulic actuator, a pressure sensor may be applied in addition to or instead of the force transducer 61. The pressure sensor is then configured to measure the pressure in the cylinder compartment on the side of the piston rod. When a force F is exerted on the shear bar, the pressure in this compartment increases. This pressure increase, detectable by the pressure sensor, is therefore a measure for the force F and can be used as a basis for monitoring the shear bar and cutting drum condition. In any embodiment where a pressure sensor is used, this sensor may be of a type and implemented in a manner known as such in the art.

Figure 5:
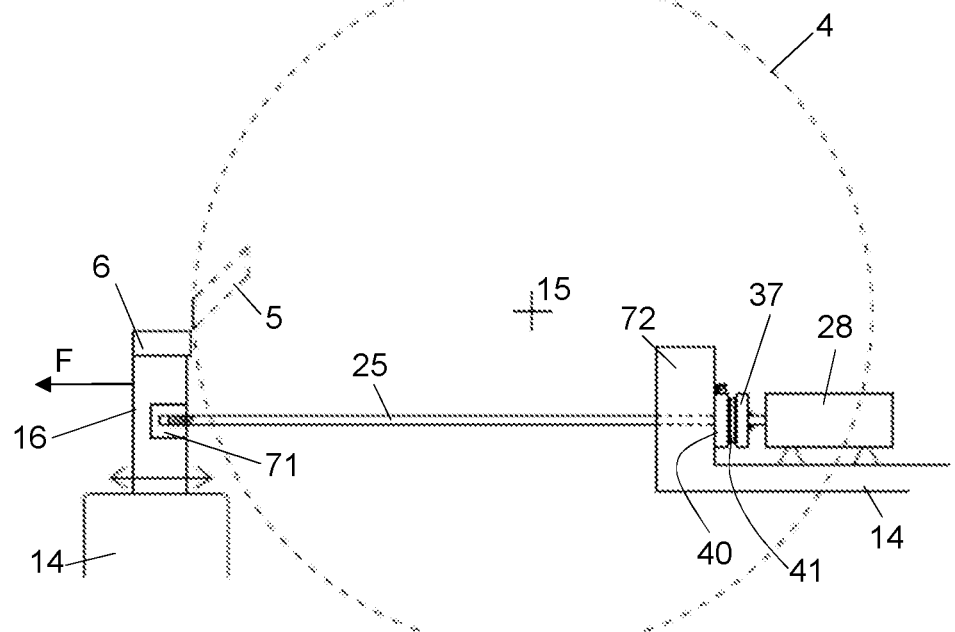
FIG. 5 shows a further alternative embodiment wherein the shear bar is displaced by a horizontal sliding motion of the shear bar holder.

According to another embodiment, illustrated in FIG. 5, the displacement mechanisms for displacing the shear bar holder 16 are not equipped with pivotable adjustment arms, but the ends of the shear bar holder 16 are slidable forward or backward (with respect to the direction of movement of the crops) for adjusting the shear bar 6 relative to the cutting drum 4 and the frame 14. The displacement mechanism on each side of the holder 16 is equipped with a threaded rotatable spindle 25 engaging with a threaded nut 71 incorporated in the shear bar holder 16, and actuated by a suitable actuator, preferably an electric motor 28. The motor 28 is fixed to the frame 14. The same type of force transducer 40 used in the first embodiment is mounted between a bracket 72 that is fixed to or uniform with the frame 14 and a disc 37 that is uniform with the spindle 25. A thrust bearing 41 is again mounted between the disc 37 and the transducer 40. The spindle 25 is directly coupled to the motor 28 (i.e. no flexible coupling required). Contrary to the first embodiment, the spindles 25 are not pivotable which allows for a less complex construction. The force transducer 40 in this embodiment must however be configured to measure a higher load than in the first embodiment, given the fact that the force exerted by the spindle 25 on the frame 14 is not reduced by a lever ratio. Like the first embodiment, this embodiment has the advantages that the force transducer 40 provides a force output that is representative for the force F, and that the transducer is remote from the shear bar holder 16.

Figure 6:
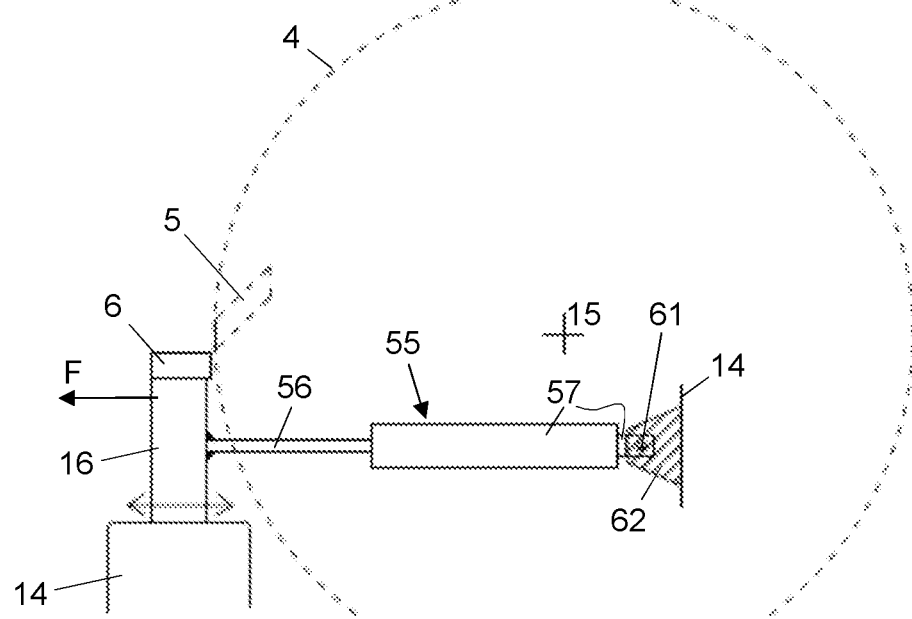
FIG. 6 shows an alternative to the embodiment of FIG. 5, wherein a variable length actuator replaces the spindle and electric motor combination.

The spindle in the embodiment of FIG. 5 may be replaced by an adjustable length actuator 55, hydraulic or electric, see FIG. 6. In the illustrated embodiment, the slidable portion 56 is fixed to the shear bar 16, while the base portion 57 is again connected to the frame via a draft sensor 61. In this embodiment, the draft sensor 61 does not need to be mounted in a ball joint, given that the actuator is not required to pivot relative to the frame 14. The extension or the retraction of the actuator 55 results in adjustment of the shear bar 6 with respect to the frame 14 by the sliding movement of the shear bear holder 16. The draft sensor 61 measures the force exerted by the actuator 55 on the frame when the harvester is in operation, said force being representative of the force F exerted on the shear bar holder 16 when the harvester is operational. When the actuator 55 is a hydraulic actuator, a pressure sensor may be applied in addition to or instead of the force transducer 61, for measuring the pressure in the piston rod compartment of the cylinder of the actuator 55, in analogy with the embodiment shown in FIG. 5.

In most embodiments of the invention, the number of shear bar displacement mechanisms is two, one placed on each end of the shear bar holder. The number of displacement mechanisms can however be higher than two, with for example an additional mechanism placed near the centre of the shear bar holder, and provided that measures are taken to avoid that the central mechanism obstructs the crop flow.

The invention is preferably related to a self-propelled forage harvester as illustrated in FIG. 1, but the invention is also applicable to a stationary forage harvester.

Figure 4B:
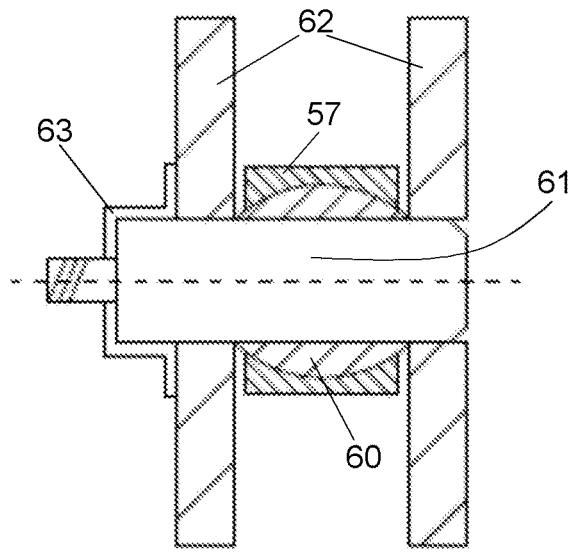

In the above embodiments, it is seen that the force transducer 40 or 61 is mounted at the location of the frame 14 where the actuator is coupled to said frame 14. In the embodiment of FIG. 2, this location is defined by the pin 30 which is part of the frame 14 in fact: the force transducer is effectively mounted between the pin 30 (in fact between the side piece 36 that remains in contact with the pin) and the disc 37 that is uniform with the actuator (the spindle 25). In the embodiment of FIG. 4b, the draft sensor 61 is equally mounted between the frame (the plates 62) and the base portion 57 of the variable length actuator 55. Alternatively, the force transducer could be mounted in the location where the actuator is coupled to the shear bar holder 16 or to a structure (such as the adjustment arm 18) that is rigidly attached to the shear bar holder.

The invention claimed is:

1. A forage harvester comprising:
   a frame;
   a cutting arrangement including a cutting drum that is rotatable about a rotation axis with respect to the frame, and a shear bar holder configured to receive a shear bar attached thereto; and
   a plurality of displacement mechanisms, each displacement mechanism including an actuator for displacing the shear bar with respect to the cutting drum and the frame, at least one of the displacement mechanisms include a sensor arrangement to measure one or more values representative of a force exerted on the shear bar and the shear bar holder when the cutting drum is rotating and cutting crops supplied to an area between the cutting drum and the shear bar, wherein the actuator is a hydraulic variable length actuator comprising a hydraulic cylinder and a hydraulic piston and a piston rod, the hydraulic piston dividing the cylinder into two compartments, one of the compartments being a piston rod compartment, and wherein the sensor arrangement includes a pressure sensor to measure a pressure in the piston rod compartment of the cylinder.

2. The harvester according to claim 1, wherein the sensor arrangement further comprises a force transducer configured to measure a force exerted by the actuator on the frame of the harvester.

3. The harvester according to claim 2, wherein the actuator is mounted between a first location on the frame and a second location on the shear bar holder or on a structure that is rigidly attached to or uniform with the shear bar holder and wherein the force transducer is mounted in the first location, between the actuator and the frame.

4. The harvester according to claim 3, wherein each displacement mechanism includes a pivotable adjustment arm and wherein the actuator actuates a pivoting motion of the adjustment arm about an axis that is substantially parallel to the rotation axis of the cutting drum, the shear bar holder being attached to a lower portion of the adjustment arm, the actuator being pivotably connected to an upper portion of the adjustment arm.

5. The forage harvester according to claim 4, wherein the actuator is a variable length actuator pivotably connected to the upper portion of the adjustment arm and to the frame by a first and second pivot respectively.

6. The forage harvester according to claim 3, wherein the shear bar holder is slidable in a forward or a backward direction and the actuator displaces the shear bar holder in said forward or backward direction.

7. A forage harvester, comprising:
   a frame;
   a cutting arrangement including a cutting drum that is rotatable about a rotation axis with respect to the frame, and a shear bar holder configured to receive a shear bar attached thereto; and
   a plurality of displacement mechanisms, each displacement mechanism including an actuator for displacing the shear bar with respect to the cutting drum and the frame, at least one of the displacement mechanisms include a sensor arrangement to measure one or more values representative of a force exerted on the shear bar and the shear bar holder when the cutting drum is rotating and cutting crops supplied to an area between the cutting drum and the shear bar, wherein the sensor arrangement comprises a force transducer configured to measure a force exerted by the actuator on the frame of the harvester, wherein the actuator is mounted between a first location on the frame and a second location on the shear bar holder or on a structure that is rigidly attached to or uniform with the shear bar holder and wherein the force transducer is mounted in the first location, between the actuator and the frame, wherein each displacement mechanism includes a pivotable adjustment arm and wherein the actuator actuates a pivoting motion of the adjustment arm about an axis that is substantially parallel to the rotation axis of the cutting drum, the shear bar holder being attached to a lower portion of the adjustment arm, the actuator being pivotably connected to an upper portion of the adjustment arm, wherein the actuator is a threaded spindle that is rotatable about its central axis, wherein said rotation is driven by a motor mounted on the frame, the spindle engages with a threaded nut mounted in the upper portion of the adjustment arm, the threaded nut being pivotable with respect to the adjustment arm, the spindle traverses a pin attached to the frame and extends in the direction of the rotation axis of the cutting drum, the spindle being pivotable about a longitudinal axis of the pin, and the force transducer is a ring-shaped transducer mounted between the pin and a disc that is uniform with the spindle.

8. The forage harvester according to claim 7, wherein the pin is cylindrical in shape and fixed to the frame, the spindle being clamped to the pin by a pair of side pieces on either side of the pin which are pivotable about the cylindrical pin, and wherein the force transducer is mounted between the disc and the side piece on the side of the motor.

9. A forage harvester, comprising:
   a frame;
   a cutting arrangement including a cutting drum that is rotatable about a rotation axis with respect to the frame, and a shear bar holder configured to receive a shear bar attached thereto; and
   a plurality of displacement mechanisms, each displacement mechanism including an actuator for displacing the shear bar with respect to the cutting drum and the frame, at least one of the displacement mechanisms include a sensor arrangement to measure one or more values representative of a force exerted on the shear bar and the shear bar holder when the cutting drum is rotating and cutting crops supplied to an area between the cutting drum and the shear bar, wherein the sensor arrangement comprises a force transducer configured to measure a force exerted by the actuator on the frame of the harvester, wherein the actuator is mounted between a first location on the frame and a second location on the shear bar holder or on a structure that is rigidly attached to or uniform with the shear bar holder and wherein the force transducer is mounted in the first location, between the actuator and the frame, wherein each displacement mechanism includes a pivotable adjustment arm and wherein the actuator actuates a pivoting motion of the adjustment arm about an axis that is substantially parallel to the rotation axis of the cutting drum, the shear bar holder being attached to a lower portion of the adjustment arm, the actuator being pivotably connected to an upper portion of the adjustment arm, wherein the actuator is a variable length actuator pivotably connected to the upper portion of the adjustment arm and to the frame by a first and second pivot respectively, wherein the force transducer is a draft sensor mounted in the pivot that connects the actuator to the frame.

10. A forage harvester, comprising:
a frame;
a cutting arrangement including a cutting drum that is rotatable about a rotation axis with respect to the frame, and a shear bar holder configured to receive a shear bar attached thereto; and
a plurality of displacement mechanisms, each displacement mechanism including an actuator for displacing the shear bar with respect to the cutting drum and the frame, at least one of the displacement mechanisms include a sensor arrangement to measure one or more values representative of a force exerted on the shear bar and the shear bar holder when the cutting drum is rotating and cutting crops supplied to an area between the cutting drum and the shear bar, wherein the sensor arrangement comprises a force transducer configured to measure a force exerted by the actuator on the frame of the harvester, wherein the actuator is mounted between a first location on the frame and a second location on the shear bar holder or on a structure that is rigidly attached to or uniform with the shear bar holder and wherein the force transducer is mounted in the first location, between the actuator and the frame, wherein the shear bar holder is slidable in a forward or a backward direction and the actuator displaces the shear bar holder in said forward or backward direction, wherein the actuator is a threaded spindle that is rotatable about its central axis wherein said rotation is driven by a motor mounted on the frame, the spindle engages with a threaded nut incorporated in the shear bar holder, the force transducer is a ring-shaped transducer mounted between the frame and a disc that is uniform with the spindle.

11. A forage harvester, comprising:
a frame;
a cutting arrangement including a cutting drum that is rotatable about a rotation axis with respect to the frame, and a shear bar holder configured to receive a shear bar attached thereto; and
a plurality of displacement mechanisms, each displacement mechanism including an actuator for displacing the shear bar with respect to the cutting drum and the frame, at least one of the displacement mechanisms include a sensor arrangement to measure one or more values representative of a force exerted on the shear bar and the shear bar holder when the cutting drum is rotating and cutting crops supplied to an area between the cutting drum and the shear bar, wherein the sensor arrangement comprises a force transducer configured to measure a force exerted by the actuator on the frame of the harvester, wherein the actuator is mounted between a first location on the frame and a second location on the shear bar holder or on a structure that is rigidly attached to or uniform with the shear bar holder and wherein the force transducer is mounted in the first location, between the actuator and the frame, wherein the shear bar holder is slidable in a forward or a backward direction and the actuator displaces the shear bar holder in said forward or backward direction, wherein the actuator is a variable length actuator having a first and second end, wherein the first end is attached to the shear bar holder and the second end is connected to the frame and wherein the force transducer is a draft sensor mounted in the connection of the second end of the actuator to the frame.

12. The forage harvester according to claim 11, wherein the variable length actuator is a hydraulic actuator comprising a hydraulic cylinder and a hydraulic piston and a piston rod, the hydraulic piston dividing the cylinder into two compartments, one of the compartments being a piston rod compartment, and wherein the sensor arrangement includes a pressure sensor measures a pressure in the piston rod compartment of the cylinder.

* * * * *